(12) United States Patent
So et al.

(10) Patent No.: US 10,886,792 B2
(45) Date of Patent: Jan. 5, 2021

(54) CHARGING MODULE TO ACCOMMODATE A RECHARGEABLE DEVICE

(71) Applicant: Hewlett-Packard Development Company, L.P., Houston, TX (US)

(72) Inventors: Chi So, Houston, TX (US); Shaheen Saroor, Houston, TX (US); Gregory C. Franke, Houston, TX (US); Ronald E. Deluga, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 389 days.

(21) Appl. No.: 15/759,071

(22) PCT Filed: Sep. 29, 2015

(86) PCT No.: PCT/US2015/052974
§ 371 (c)(1),
(2) Date: Mar. 9, 2018

(87) PCT Pub. No.: WO2017/058180
PCT Pub. Date: Apr. 6, 2017

(65) Prior Publication Data
US 2019/0052129 A1    Feb. 14, 2019

(51) Int. Cl.
*H02J 50/90* (2016.01)
*H02J 7/00* (2006.01)
(Continued)

(52) U.S. Cl.
CPC ............ *H02J 50/90* (2016.02); *G06F 1/26* (2013.01); *H02J 7/0045* (2013.01); *H02J 7/025* (2013.01); *H02J 50/00* (2016.02); *H02J 50/80* (2016.02)

(58) Field of Classification Search
CPC ...................................................... H02J 50/90
(Continued)

(56) References Cited

U.S. PATENT DOCUMENTS 9,632,969 B2 *  4/2017  Hendin ................ G06F 1/1684
2008/0258679 A1 * 10/2008  Manico ................ H02J 7/0042
                                                              320/106
(Continued)

FOREIGN PATENT DOCUMENTS

CN       203504224         3/2014
CN       2040128022        12/2014
(Continued)

OTHER PUBLICATIONS

Kal Kaur, "Wireless Charging Solutions for the 'Internet of Things': an Interview with Omri Lachman at Humavox", AZO Sensors, Jul. 31, 2015, 4 pages.

*Primary Examiner* — Jerry D Robbins
(74) *Attorney, Agent, or Firm* — HP Inc. Patent Department

(57) ABSTRACT

Examples disclosed herein provide a computing device to charge a rechargeable device. An example computing device can include a module with an enclosure to accommodate the rechargeable device. The computing device can include a transmitter within the module to wirelessly charge the rechargeable device via a receiver disposed within the rechargeable device. The computing device can include a display surface to replicate content illustrated on a screen of the rechargeable device, when the rechargeable device is to be disposed within the enclosure.

15 Claims, 3 Drawing Sheets

(51) Int. Cl.
    *H02J 7/02*     (2016.01)
    *H02J 50/00*    (2016.01)
    *H02J 50/80*    (2016.01)
    *G06F 1/26*     (2006.01)

(58) Field of Classification Search
    USPC .......................................................... 320/108
    See application file for complete search history.

(56) References Cited

U.S. PATENT DOCUMENTS

| | | | |
|---|---|---|---|
| 2010/0194335 A1* | 8/2010 | Kirby | H02J 5/005 320/108 |
| 2011/0127955 A1 | 6/2011 | Chen et al. | |
| 2013/0252577 A1 | 9/2013 | Jordan | |
| 2014/0176054 A1 | 6/2014 | Porat et al. | |
| 2015/0064679 A1* | 3/2015 | Ballestra | G09B 7/07 434/324 |

FOREIGN PATENT DOCUMENTS

| | | |
|---|---|---|
| CN | 204216602 | 3/2015 |
| KR | 20100023941 | 3/2010 |
| KR | 101423028 | 7/2014 |
| TW | 200702995 A | 1/2007 |
| TW | M449289 | 3/2013 |
| TW | 201415231 A | 4/2014 |
| TW | 201511437 A | 3/2015 |
| WO | WO-2014-110323 A1 | 7/2014 |

* cited by examiner

CHARGING MODULE TO ACCOMMODATE A RECHARGEABLE DEVICE

BACKGROUND

Wireless power transfer is the transmission of electrical power from a power source to a consuming device, all without using solid wires or conductors. Wireless transmission includes the ability to power electrical devices by a number of different power transmission technologies that use electromagnetic fields.

DETAILED DESCRIPTION

In wireless power transfer, a transmitter device connected to a power source generally transmits power by electromagnetic fields across an intervening space to receiver devices, where it is then converted back to electric power & utilized. As an example, the effective charging area or wireless range for powering receiver devices may be limited to the dimensions of the transmitter device itself, preventing other objects or devices from occupying the same space as the transmitter device. Reserving space solely for the transmitter device to occupy may be challenging, particularly where space may be limited or constrained.

Examples disclosed herein provide a computing device with a module having an enclosure for accommodating rechargeable devices that are wirelessly charged when they are disposed within the enclosure. With the module occupying the same space as the computing device, there is a reduction in footprint, which is particularly useful in space-limited or constrained environments. In addition, as the rechargeable devices are wirelessly charged when they are disposed within the enclosure, a top surface of the computing device can be reserved for other uses, as will be further described.

Figure 1:
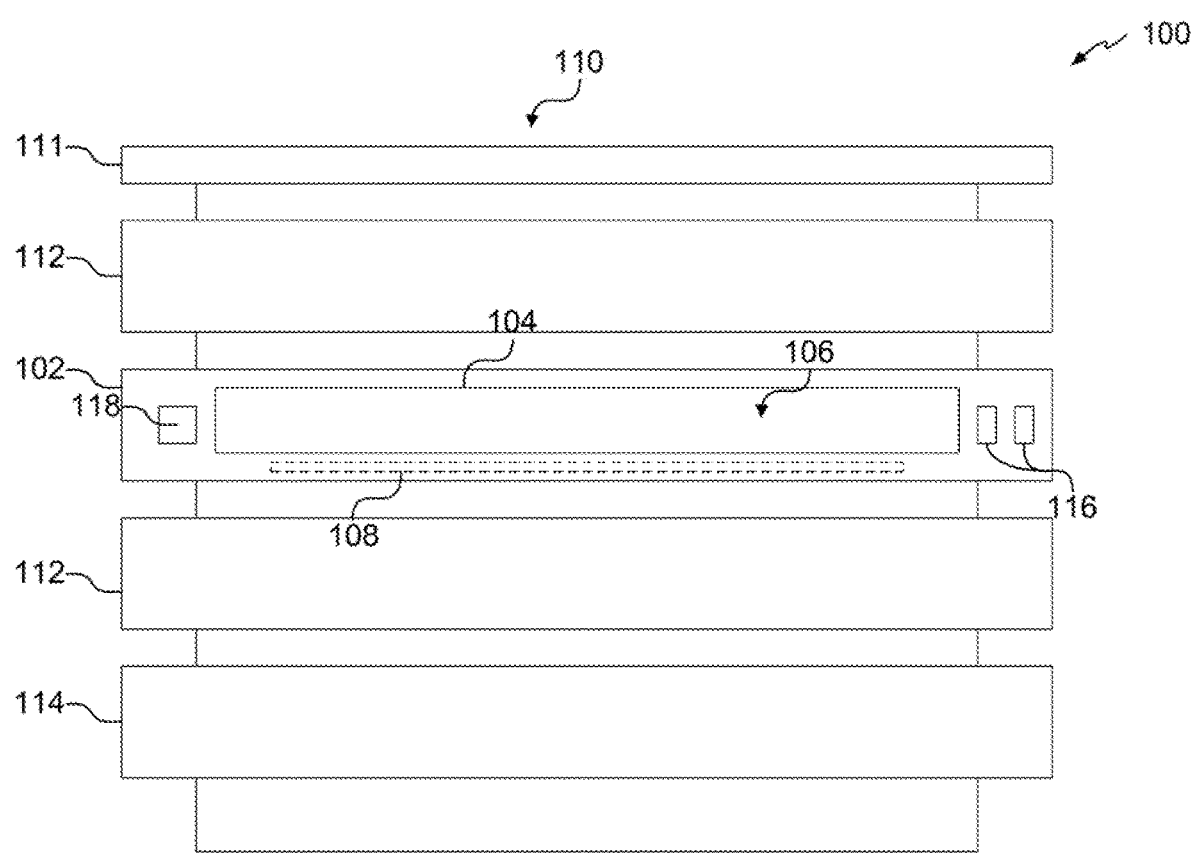
FIG. 1 illustrates a computing device including a set of modules, one module with an enclosure to accommodate a rechargeable device for wireless charging, according to an example.

With reference to the figures, FIG. 1 illustrates a computing device 100 including a set of modules 112, one module 102 with an enclosure 104 to accommodate a rechargeable device for wireless charging, according to an example. As illustrated, the modules 112 are arranged in a stackable configuration, in order to minimize the footprint of the computing device 100, which is particularly useful in space-limited or constrained environments. As an example, the modules 112 may be swapped out with other modules, for example, based on use or when upgrades are available. For example, one user may choose a set of modules 112 for a particular use, and another user may choose a different set of modules 112 for a different use. In addition, the number of modules 112 for a use case may vary as well.

As an example, one of the modules, labelled as 102, may include an enclosure 104 for accommodating a rechargeable device for wireless charging, as will be further described. Disposed within the module 102 is a transmitter 108 that may be used to wirelessly charge the rechargeable device when it is within a wireless range or effective charging area of the transmitter 108. In order for the transmitter 108 to wirelessly charge the rechargeable device, such as a smartphone, the rechargeable device may include a receiver (not illustrated) disposed within, to convert the electromagnetic fields from the transmitter 108 back to electric power and utilized by the rechargeable device (e.g., for charging). As the receiver disposed within the rechargeable device needs to be within the effective charging area of the transmitter 108 in order to wirelessly power the rechargeable device, the enclosure 104 allows for the receiver of the rechargeable device to be within the effective charging area. As an example, the enclosure 104 may include guide rails to guide the rechargeable device within the enclosure 104, so that the transmitter 108 is aligned with the receiver for an effective charging of the rechargeable device, as will be further described.

Referring to FIG. 1, the enclosure 104 includes an opening 106 to accommodate the rechargeable device. As an example, the enclosure 104 may be accessible by a door that covers the opening 106, or the opening 106 may be left open without a door. The computing device 100 may include light indicators 116 or other visual means on the module 102 to indicate whether the rechargeable device is aligned within the enclosure 104 and/or charging. If there is any issue, for example, with the alignment of the rechargeable device within the enclosure 104, the appropriate light indicator may be lit in order to inform the user of the computing device 100. In addition to visual means, audio cues may be utilized as well to alert the user for various reasons (e.g., misalignment or charging complete).

As an example, the computing device 100 may include an ejection mechanism 118 to eject the rechargeable device from the enclosure 104. However, rather than the ejection mechanism 118, manual removal of the rechargeable device may be another option, for example, if the opening 106 is large enough for fingers to enter, of if an area of the rechargeable device extends outside the enclosure 104, which can be used to remove the rechargeable device from the enclosure 104.

As the rechargeable device is wirelessly charged, when it is disposed within the enclosure 104, a top surface 110 of the computing device 100 can be reserved for other uses. For example, various other objects may be placed along the top surface 110, and these objects may not interfere with the device charging occurring within the module 102. As an example, a display surface 111 may be disposed along the top surface 110 of the computing device 100, to illustrate content output by the computing device 100.

When the rechargeable device is disposed within the enclosure 104 for wireless charging, a screen of the rechargeable device may be inaccessible from a user. As a result, alerts or notifications illustrated on the screen of the rechargeable device may be missed. In addition, control of the rechargeable device may be limited or nonexistent until the rechargeable device is retrieved from the enclosure 104 after charging. As an example, in order to grant a user access to the rechargeable device while it is being wirelessly charged within the enclosure 104, the display surface 111 may be used to replicate the content illustrated on the screen of the rechargeable device.

Software loaded on the computing device 100 may synchronize the rechargeable device with the computing device 100, in order to replicate the content. Various wireless communication standards may be used to replicate the content illustrated on the screen of the rechargeable device onto the display surface 111. As an example, a combination of wireless local area network (WLAN) and/or Bluetooth protocols may be used. In addition to replicating the contents of the screen of the rechargeable device, the rechargeable device may be controllable via the display surface 111, when the rechargeable device is disposed within the enclosure 104. As an example, the display surface 111 may be a touchscreen surface, allowing a user to control the rechargeable device by interacting with the replicated content on the display surface 111. Although the display surface 111 is described as replicating the content illustrated on the screen of the rechargeable device, any other display coupled to the computing device 100 may be used to replicate the content.

As mentioned above, as the modules of the computing device 100 may be arranged in a stackable configuration, the module 102 may be placed in the middle or bottom, as an example. As illustrated, the module 102 may be arranged between at least a base 114 of the computing device 100 and the display surface 111. In addition, as future wireless charging standards may be introduced, the module 102 may be swappable with another module that supports these future wireless charging standards.

Figure 2:
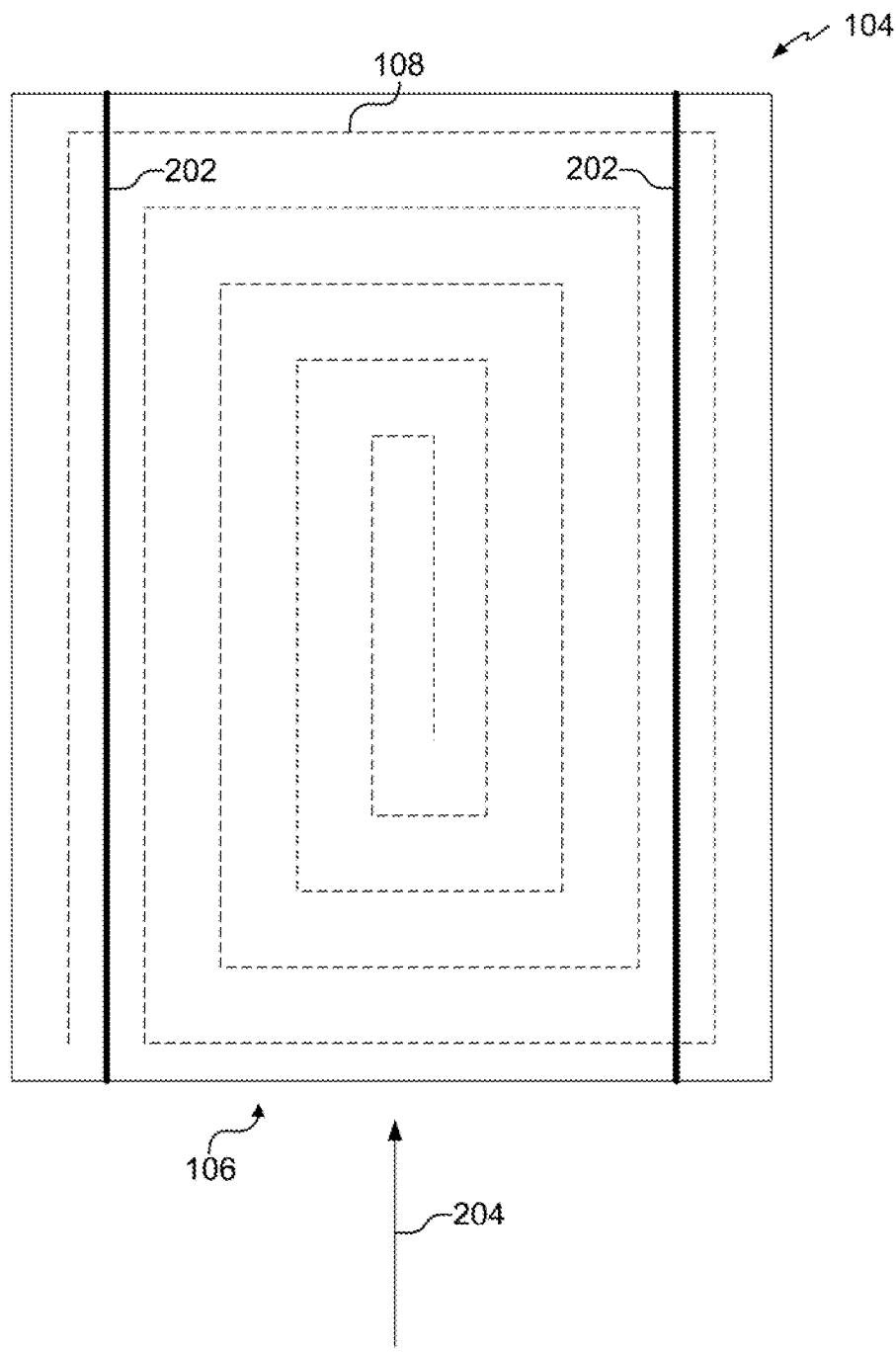
FIG. 2 illustrates a top view of what is contained within the enclosure of module, according to an example.

FIG. 2 illustrates a top view of what is contained within the enclosure 104 of module 102, according to an example. Rechargeable devices may be placed within the enclosure via the opening 106, indicated by arrow 204. As mentioned above, the enclosure 104 may include guide rails 202 or similar mechanisms to guide the rechargeable device within the enclosure 104, so that the transmitter 108 is aligned with the receiver of the rechargeable device for an effective charging of the rechargeable device. As illustrated, the guide rails 202 may ensure that as a rechargeable device is disposed within the enclosure, a receiver of the rechargeable device is above and within wireless range of the transmitter 108, and not in an area that is outside of the wireless range of the transmitter 108.

Figure 3:
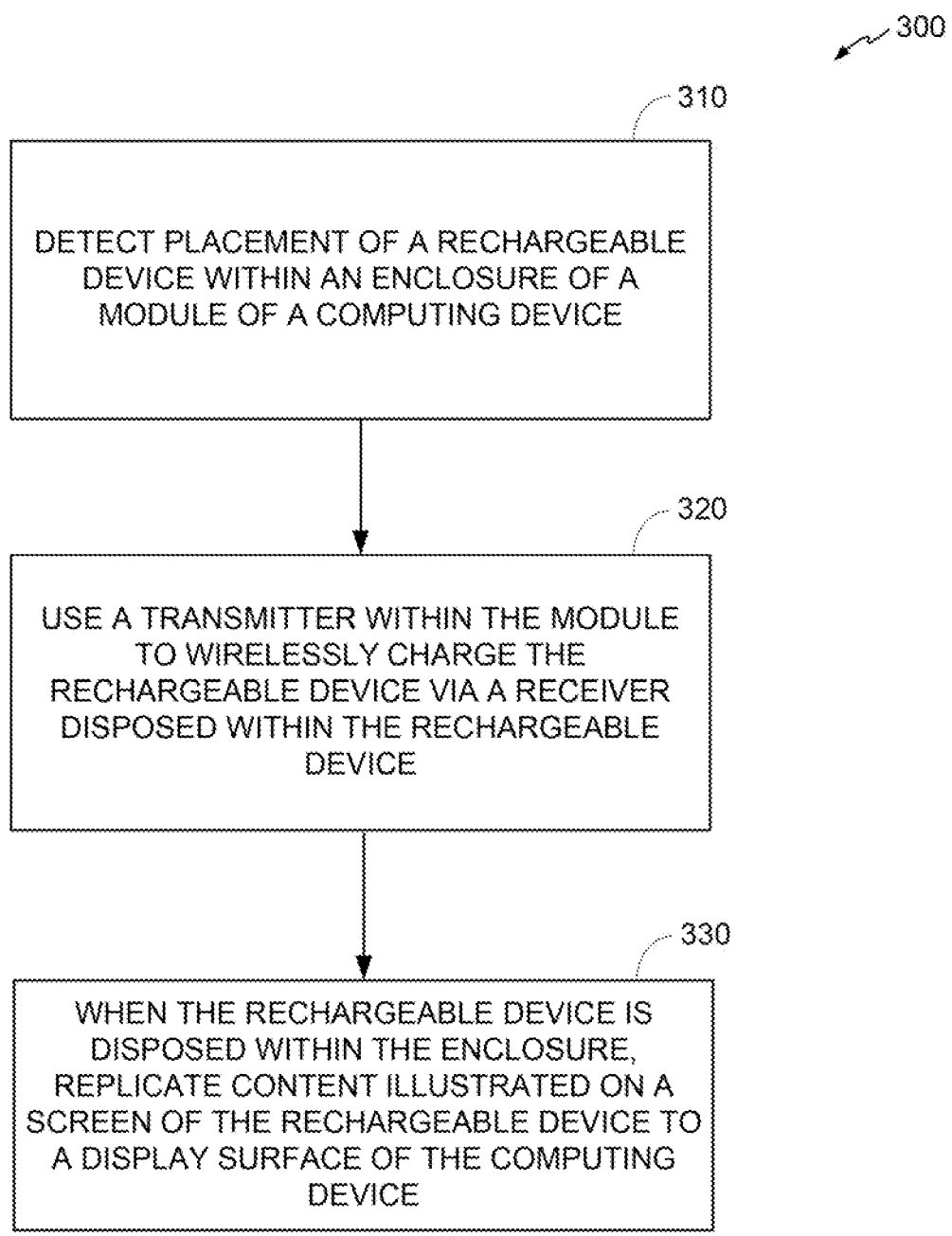
FIG. 3 is a flow diagram in accordance with an example of the present disclosure.

Referring to FIG. 3, a flow diagram is illustrated in accordance with various examples. The flow diagram illustrates, in a particular order, processes for controlling and charging a rechargeable device as it is disposed within an enclosure of a module of a computing device. The order of the processes is not meant to limit the disclosure. Rather, it is expressly intended that one or more of the processes may occur in other orders or simultaneously. The disclosure is not to be limited to a particular example.

A method 300 may begin and progress to 310, where the computing device may detect placement of the rechargeable device within the enclosure of the module of the computing device. As an example, the computing device may detect the placement of the rechargeable device when a transmitter within the module detect a receiver disposed within the rechargeable device.

Progressing to 320, the computing device may use the transmitter within the module to wirelessly charge the rechargeable device via the receiver disposed within the rechargeable device. As mentioned above, the enclosure may include guide rails in order to ensure that the receiver aligns and be within wireless range of the transmitter.

Progressing to 330, when the rechargeable device is disposed within the enclosure, the computing device may replicate content illustrated on a screen of the rechargeable device to a display surface of the computing device. Software loaded on the computing device may synchronize the rechargeable device with the computing device, in order to replicate the content. Various wireless communication standards may be used to replicate the content illustrated on the screen of the rechargeable device onto the display surface of the computing device. As an example, a combination of wireless local area network (WLAN) and/or Bluetooth protocols may be used. As a result, the rechargeable device may be accessed and controlled while it is being charged within the enclosure.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising:
   a module with an enclosure coupled to the computing device to accommodate a rechargeable device unrelated to the computing device;
   a transmitter within the module to wirelessly charge the rechargeable device unrelated to the computing device via a receiver disposed within the rechargeable device unrelated to the computing device; and
   a display surface to replicate content illustrated on a screen of the rechargeable device unrelated to the computing device, when the rechargeable device unrelated to the computing device is to be disposed within the enclosure.

2. The computing device of claim 1, wherein the display surface is disposed along a top surface of the computing device.

3. The computing device of claim 1, wherein the rechargeable device unrelated to the computing device is controllable via the display surface, when the rechargeable device unrelated to the computing device is disposed within the enclosure.

4. The computing device of claim 1, wherein the module is arranged between a base of the computing device and the display surface.

5. The computing device of claim 1, wherein the module is swappable with another module that supports additional wireless charging standards.

6. The computing device of claim 1, wherein the enclosure is accessible by a door disposed on a side of the module.

7. The computing device of claim 1, wherein the enclosure comprises guide rails to guide the rechargeable device unrelated to the computing device within the enclosure, so that the transmitter is aligned with the receiver for an effective charging of the rechargeable device unrelated to the computing device.

8. The computing device of claim 7, comprising light indicators to indicate whether the rechargeable device unrelated to the computing device is aligned within the enclosure and charging.

9. The computing device of claim 1, comprising an ejection mechanism to eject the rechargeable device unrelated to the computing device from the enclosure.

10. A method comprising:
   detecting placement of a rechargeable device unrelated to a computing device within an enclosure of a module of the computing device, wherein the enclosure is coupled to the computing device;
   using a transmitter within the module to wirelessly charge the rechargeable device unrelated to the computing device via a receiver disposed within the rechargeable device unrelated to the computing device; and
   when the rechargeable device unrelated to the computing device is disposed within the enclosure, replicating content illustrated on a screen of the rechargeable device unrelated to the computing device to a display surface of the computing device.

11. The method of claim 10, comprising controlling the rechargeable device unrelated to the computing device via the display surface, when the rechargeable device unrelated to the computing device is to be disposed within the enclosure.

12. The method of claim 10, comprising indicating, via light indicators, when the rechargeable device unrelated to the computing device is to be aligned within the enclosure and charging.

13. A computing device comprising:
   a module with an enclosure coupled to the computing device to accommodate a rechargeable device unrelated to the computing device;
   a transmitter within the module to wirelessly charge the rechargeable device unrelated to the computing device via a receiver disposed within the rechargeable device unrelated to the computing device; and
   light indicators to indicate whether the rechargeable device unrelated to the computing device is aligned within the enclosure and charging.

14. The computing device of claim 13, wherein the enclosure comprises guide rails to guide the rechargeable device unrelated to the computing device within the enclosure, so that the transmitter is aligned with the receiver for an effective charging of the rechargeable device unrelated to the computing device.

15. The computing device of claim 13, comprising a display surface to replicate content illustrated on a screen of the rechargeable device unrelated to the computing device, when the rechargeable device unrelated to the computing device is to be disposed within the enclosure.

\* \* \* \* \*